United States Patent
Suzuki

(10) Patent No.: US 7,106,299 B2
(45) Date of Patent: Sep. 12, 2006

(54) INPUT CONTROL SYSTEM WITH THE ABILITY OF SETTING ARBITRARY SWITCH FUNCTIONS OF THE SWITCH INPUT SECTION

(75) Inventor: Shoji Suzuki, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 178 days.

(21) Appl. No.: 09/804,812

(22) Filed: Mar. 13, 2001

(65) Prior Publication Data

US 2001/0030641 A1    Oct. 18, 2001

(30) Foreign Application Priority Data

Mar. 14, 2000    (JP)    ............................. 2000-069861

(51) Int. Cl.
 G09G 5/08    (2006.01)
 G09G 5/00    (2006.01)
(52) U.S. Cl. ...................................... 345/160; 345/173
(58) Field of Classification Search ........ 345/156–173;
   361/679, 680, 681, 683, 686; 341/22; 715/864;
   G09G 5/00, 5/08; G06F 3/033
 See application file for complete search history.

(56) References Cited

U.S. PATENT DOCUMENTS

| | | | | |
|---|---|---|---|---|
| 4,786,895 A | * | 11/1988 | Castaneda | .................. 345/160 |
| 5,355,148 A | * | 10/1994 | Anderson | .................... 341/31 |
| 5,677,711 A | | 10/1997 | Kuo | |
| 5,883,619 A | * | 3/1999 | Ho et al. | .................... 345/163 |
| 5,969,712 A | * | 10/1999 | Morita et al. | ............... 345/179 |
| 5,982,358 A | * | 11/1999 | Fleming, III | ................ 345/168 |
| 6,388,660 B1 | * | 5/2002 | Manser et al. | .............. 345/173 |
| 6,400,376 B1 | * | 6/2002 | Singh et al. | ................ 345/156 |
| 6,469,694 B1 | * | 10/2002 | Mikan | ......................... 345/168 |
| 6,757,002 B1 | * | 6/2004 | Oross et al. | ................ 715/864 |

FOREIGN PATENT DOCUMENTS

| | | | |
|---|---|---|---|
| DE | 19500033 A1 | * | 7/1996 |
| JP | 02306329 A | * | 12/1990 |
| JP | 11039092 A | * | 2/1999 |

\* cited by examiner

*Primary Examiner*—Alexander Eisen
(74) *Attorney, Agent, or Firm*—Brinks Hofer Gilson & Lione

(57) ABSTRACT

An input control system is operative to set functions of four switches of a switch input section, thereby resolving the problem of intricate operation, particularly the screen scroll operation, which has been encountered by the conventional input scheme based on an input pad and click keys.

4 Claims, 3 Drawing Sheets

INPUT CONTROL SYSTEM WITH THE ABILITY OF SETTING ARBITRARY SWITCH FUNCTIONS OF THE SWITCH INPUT SECTION

BACKGROUND OF THE INVENTION

1. Field of the Invention

The present invention relates to an input control system for controlling a coordinate input section for the entry of coordinate data on the screen and a switch input section, and particularly to an input control system capable of setting with a control section function of switches arbitrarily which constitute a switch input section.

2. Description of the Prior Art

Conventional computers of the notebook type employ input systems (controllers) which are of the pad type or the stick type for example. These input systems are equipped, in addition to the input pad or input stick, with a switch input section which compares with click keys of a mouse device.

In the pad type, the user slides a fingertip on a flat pad which is located near a keyboard, thereby entering commands to move a displayed pointer (cursor) in the x-axis and y-axis directions on the plane of the screen. The user can have another operation, such as patting the upper section of the pad with a fingertip, thereby entering commands pertinent to the z-axis direction. In case there are click keys provided, these keys function mainly as the right and left click keys of the mouse device.

Switches of the conventional input system have their functions and operational manners fixed mostly, and individual users are not allowed to have operational manners fitted to their own purposes.

For example, for a vertical scroll of the screen based on a pad-type input system, the user slides a fingertip vertically within the area of a certain x-wise width at the edge of the pad, so that the screen is scrolled by the amount of sliding detected in the y-axis direction. Alternatively, the user slides a fingertip on the input pad to move the pointer to coincide with the scroll bar and pushes the click key to move the slider.

However, the scroll operation by sliding a fingertip on the input pad compels the user to make sliding a number of times for a large amount of scrolling, and the slider moving operation by positioning the pointer to the scroll bar compels the user to operate the input pad and click key simultaneously. Nevertheless, these are only manners of scrolling, and users have no other means of screen scrolling.

As described above, the conventional input systems have their associated device functions fixed mostly, and the user's choice for the setting of device functions is limited even though their operational manners are intricate.

SUMMARY OF THE INVENTION

The present invention is intended to overcome the foregoing problem, and its prime object is to provide an input control system which enables users to set input device functions arbitrarily.

Another object of the present invention is to provide an input control system which enables users to have their screen scroll operation made easier than the conventional manner.

The inventive input control system includes an input means which has a coordinate input section for entering coordinate data and a switch input section for entering switch on/off data, a controller which formats and transmits data entered through the input means, and a control section which implements processes for the coordinate data and/or switch on/off data based on the formatted data provided by the controller. The switch input section has four switches. The data format generated by the controller includes fields of coordinate data entered through the coordinate input section and fields of switch on/off data in response to the four switches.

The control section generates commands in response to the switch on/off data of the four switches. The control section may be designed to be able to alter the correspondence between the commands and the switch on/off data of the four switches in accordance with input information from the input means and/or input information from other input means.

The input means having a coordinate input section, such as a flat pad, and four switches enables users to have a variety of input operations. The four switches can be assigned to arbitrary operations so as to be adapted to individual users.

The inventive input control system includes an input means which has a coordinate input section for entering coordinate data and a switch input section for entering switch on/off data, a controller which formats and transmits data entered through the input means, and a control section which implements processes for the coordinate data and/or the switch on/off data to form a picture to be displayed on a display section. The data format generated by the controller includes fields of coordinate data entered through the coordinate input section and fields of switch on/off data in response to the switch input section. The control section implements the scroll operation in accordance with the switch on/off data for the picture displayed on the display section.

The control section may be designed to carry out the screen scroll by a certain amount upon detecting certain switch on/off data in the formatted data becoming "on", continue the scroll operation so far as the switch on/off data is "on" while checking the data periodically, and stop the scroll operation upon detecting the switch on/off data becoming "off".

The switch input section has four switches, of which two switches located at a lengthwise position, that is, a far and near positions seen from the user may be used to scroll the screen up and down in accordance with the respective switch on/off data and two switches located at a right and left positions seen from the user may be used to scroll the screen right and left in accordance with the respective switch on/off data.

The switches of the switch input section may be located in close vicinity to the coordinate input section. The switch input section may be constituted by arbitrary switches on the keyboard input device which is attached to the coordinate input section.

The input means enables the user to have easy screen scroll operation based solely on the operation signals of the switches located near the coordinate input section, such as a flat pad, or of the keyboard.

DESCRIPTION OF THE PREFERRED EMBODIMENT

An embodiment of this invention will be explained with reference to the drawings.

Figure 1:
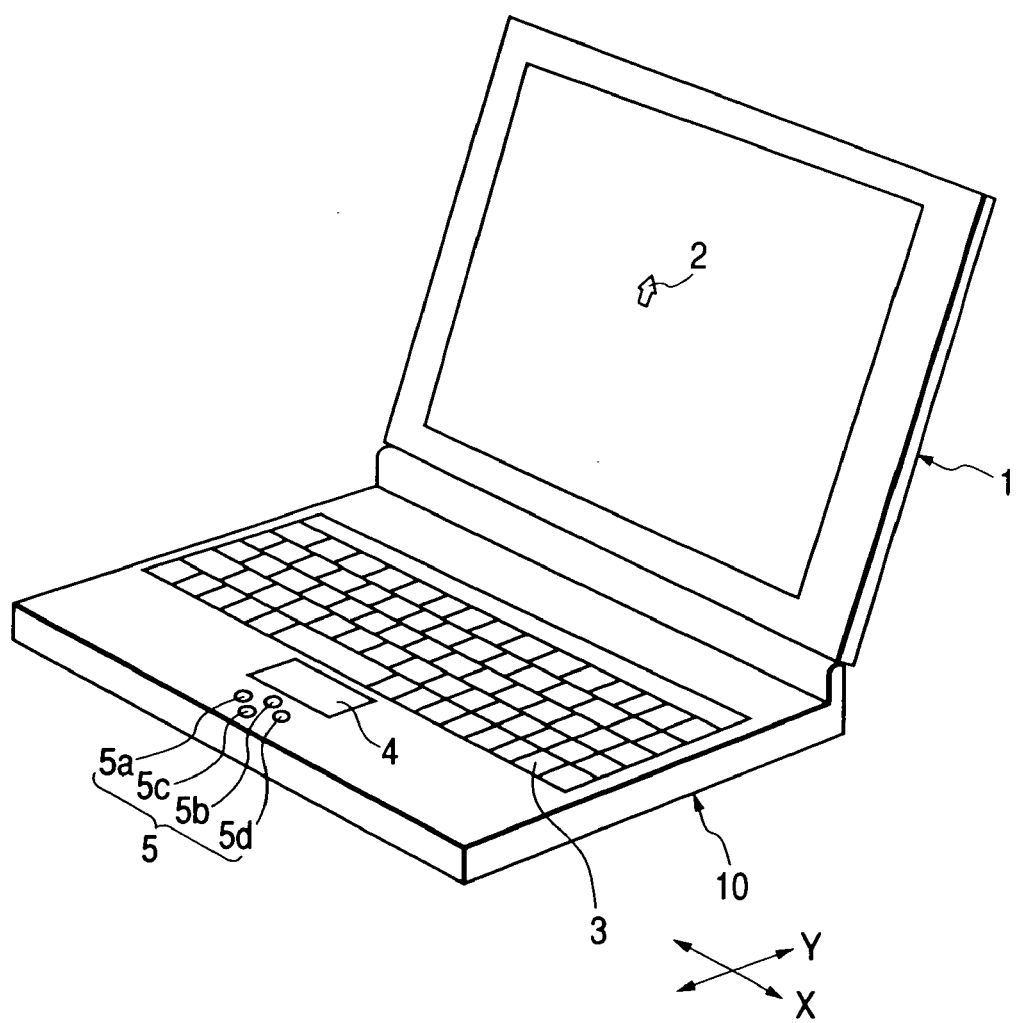
FIG. 1 is a perspective view of a notebook-type personal computer based on an embodiment of this invention.

FIG. 1 is a perspective view of a notebook-type personal computer which incorporates the inventive input control system. Reference numeral 1 denotes a display section, 2 is a pointer on a picture displayed on the display section 1, 3 is a keyboard, 4 is an input pad as a coordinate input section, 5 is a switch input section, and 10 is a computer main body.

The inventive input control system is made up mainly of the input pad 4 as a coordinate input section and the switch input section 5 as shown in FIG. 1. The inventive input control system can otherwise be a peripheral unit connected to the computer main body, instead of being built in it.

The input pad 4 is of among several types including the static capacitance detection type in which electrodes extending in the x-axis direction and electrodes extending in the y-axis direction are arranged to confront with each other, with the variation of static capacitance between a pair of confronting electrodes in response to the touch by a conductor such as a fingertip being detected, the piezoelectricity detection type in which a resistor sheet and electrodes are arranged to confront each other, with the variation of resistance between the resistor sheet and an electrode in response to the push by a fingertip or penpoint being detected, and the combination type of these static capacitance detection type and piezoelectricity detection type.

The user can enter a command of moving the displayed pointer (cursor) in the x-axis or y-axis (vertical or horizontal) direction on the screen of the display section 1 by sliding a fingertip or penpoint on the input pad 4. The user can enter a command pertinent to the z-axis direction by patting the upper section of the pad with a fingertip or the like.

The switch input section 5 has four switches 5a, 5b, 5c and 5d, which can have the assignment of the functions of the right and left click keys of the ordinary mouse device and other functions, e.g., the screen up/down scroll functions, double click function, and program routine call function. The four switches of the switch input section 5 can be laid out arbitrarily in the periphery of the input pad 4, e.g., these switches may be aligned on a straight line.

Figure 2:
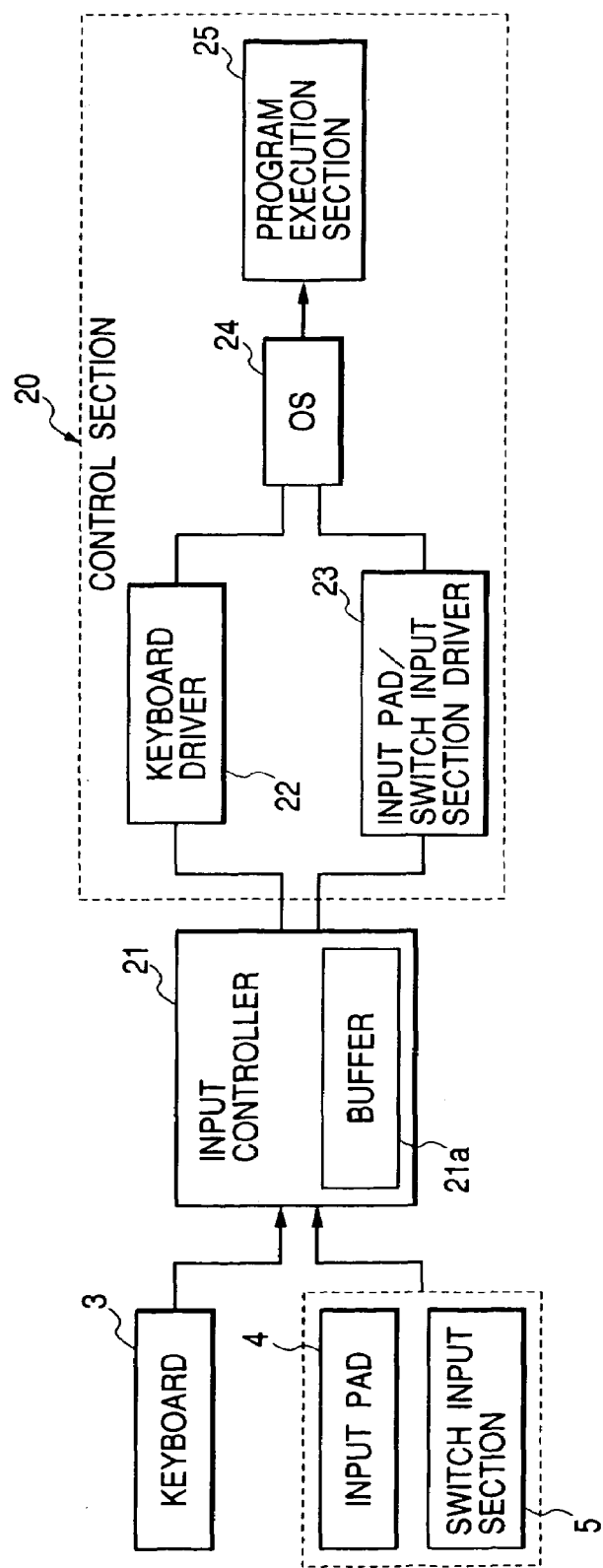
FIG. 2 is a block diagram used to explain the input data processing.

FIG. 2 is a block diagram showing the processing of data entered through the input control system. Input data from the keyboard 3 and input data from the input pad 4 and switch input section 5 are held by a buffer 21a. The buffer 21a is part of the input controller 21, which formats the data held by the buffer 21a.

The formatted data is fed to a keyboard driver 22 and input pad/switch input section driver 23 which are included in the control section 20. At this time, data from the keyboard 3 and data from the input pad 4 and switch input section 5 are read in with a different timing by the keyboard driver 22 and input pad/switch input section driver 23 on a time slice basis.

The keyboard driver 22 processes the keyboard operation data, with the resulting data being sent to an operating system (OS) 24, and a program execution section 25 implements the data conversion and other operations for the processed keyboard operation data. The input pad/switch input section driver 23 processes the operation data of the input pad/switch input section, with the resulting data being sent to the operating system (OS) 24, and the program execution section 25 implements the process and operation for the coordinate input data and switch input data.

The following Table 1 shows an example of the format of operation data which is entered through the input pad 4 and switch input section 5, held by the buffer 21a, and formatted by the input controller 21.

TABLE 1

|  | bit7 | bit6 | bit5 | bit4 | bit3 | bit2 | bit1 | bit0 |
|---|---|---|---|---|---|---|---|---|
| BYTE1 | 1 | 1 | 1 | 1 | 1 | 1 | 1 | 1 |
| BYTE2 | 0 | X6 | X5 | X4 | X3 | X2 | X1 | X0 |
| BYTE3 | 0 | X10 | X9 | X8 | X7 | SWS | DSW | SWT |
| BYTE4 | 0 | Y9 | Y8 | Y7 | 1 | SWM | SWR | SWL |
| BYTE5 | 0 | Y6 | Y5 | Y4 | Y3 | Y2 | Y1 | Y0 |
| BYTE6 | 0 | Z6 | Z5 | Z4 | Z3 | Z2 | Z1 | Z0 |

A record of operation data from the input pad 4 and switch input section 5 is 6-byte data, with each byte having 8 bits. Coordinate data and operation data of the input control system are assigned to individual bits of the data record.

In Table 1, prefix characters X, Y and Z represent coordinate data, and specifically X0–X10 are x-coordinate bits, Y0–Y9 are y-coordinate bits, and Z0–Z6 represent contact strength on the pad. The DSW bit, SWT bit, SWS bit, SWM bit, SWR bit, and SWL bit are pad/switch operation data. The DSW bit which is normally "0" becomes "1" when the input pad 4 is touched. The SWT bit which is normally "0" becomes "1" when the input pad 4 is patted. The SWS bit which is normally "0" becomes "1" when the switch 5b is pressed. The SWM bit which is normally "0" becomes "1" when the switch 5c is pressed. The SWR bit which is normally "0" becomes "1" when the switch 5d is pressed. The SWL bit which is normally "0" becomes "1" when the switch 5a is pressed.

The first byte out of the six bytes has its all bits preset to "1", which function as start bits. The second and following bytes have their first bit assigned to the start bit and preset to "0".

The input pad/switch input section driver 23 checks the bit data which is formatted as shown in Table 1, and sends the data to the OS 24, which then directs the execution of the program execution section 25.

On detecting the DSW bit of "1", indicative of a touch of the input pad 4 by the user, the input pad/switch input section driver 23 reads the X0–X10 bits and Y0–Y9 bits and operates on the OS 24 to execute the program for, for example, moving the pointer 2 which is displayed on the display section 1. On detecting the SWT bit becoming "1", it operates on the OS 24 to execute the program for, for example, selecting a displayed icon that is pointed by the pointer 2.

On detecting the SWS bit, SWM bit, SWR bit or SWL bit becoming "1" in response to a press of the switch 5a, 5b, 5c or 5d, the OS 24 executes a corresponding program for a certain operation.

For example, on detecting a press of the switch 5a or 5d and detecting the SWL bit becoming "1", the operation similar to the left click or right click operation of the mouse device is performed. On detecting a press of the switch 5b and detecting the SWM bit becoming "1", the up-scroll operation for the picture on the display section 1 is performed. On detecting a press of the switch 5c and detecting the SWM bit becoming "1", the down-scroll operation is performed.

It is possible to set functions of commands generated by the input pad/switch input section driver 23 upon detecting the SWS bit, SWM bit, SWR bit and SWL bit of "1" thereby to design or alter the operations which take place in response to the operations of switches 5*a*, 5*b*, 5*c* and 5*d*. Specifically, for example, a guide picture for the setup or change of the assignment of the switches to the input pad/switch input section driver 23 is displayed on the display section 1, and the user is prompted to instruct the assignment of switch functions to the system by operating the keyboard 3 or mouse device, the input pad 4, and the switch input section 5.

For example, in response to a press of the switch 5*b* or 5*c*, a certain program is run. Otherwise, for example, in response to a press of the switch 5*a*, 5*b*, 5*c* or 5*d*, a corresponding set of icons or menu pictures are displayed, and in response to another press of one of these switches, a corresponding menu or icon is selected.

Figure 3:
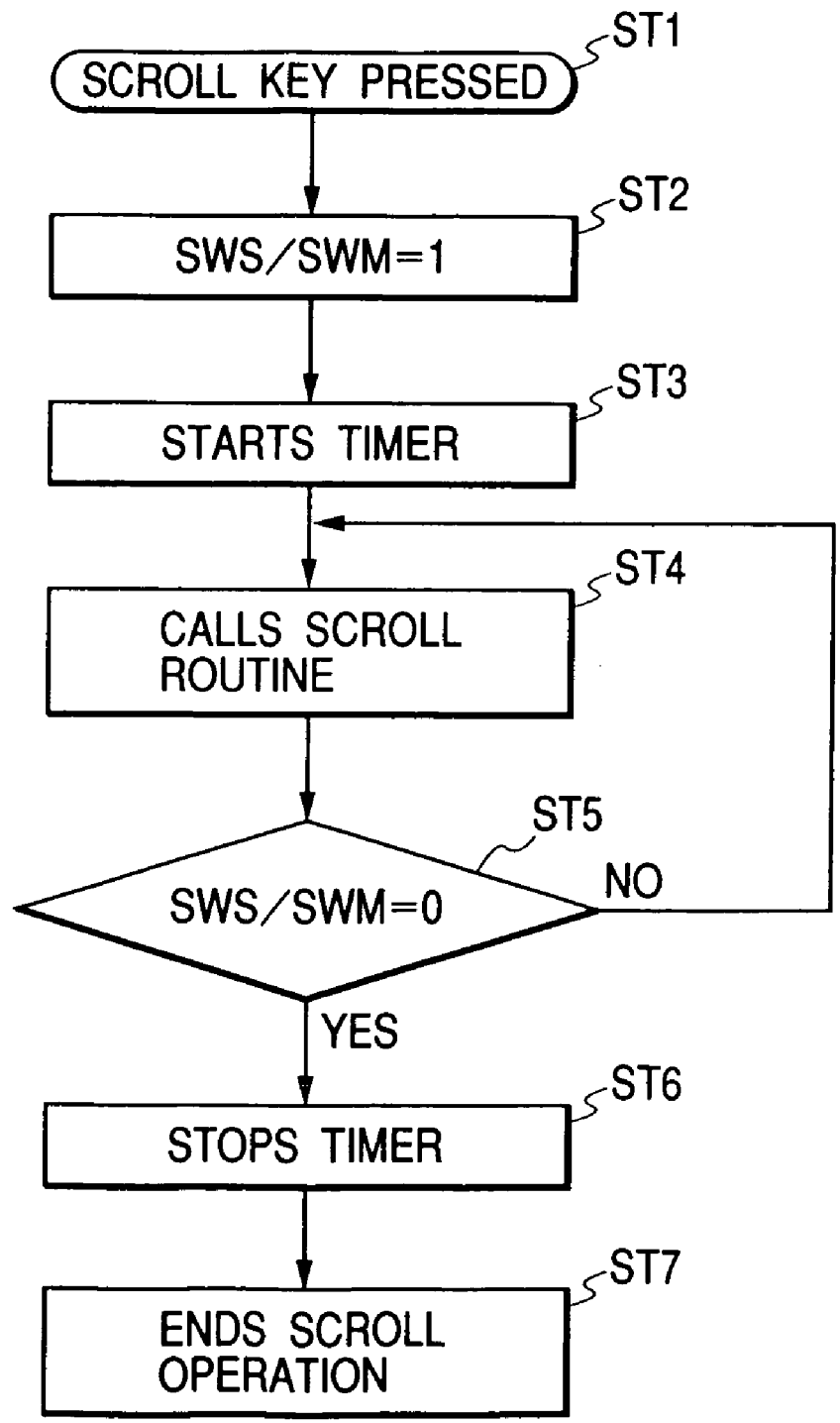
FIG. 3 is a flowchart used to explain the scroll operation.

The following explains with reference to the flowchart of FIG. 3 an example of program execution of the case of switch assignment where the screen is up-scrolled or down-scrolled in response to a press of the switch 5*b* or 5*c*.

When the user presses the switch 5*b* or 5*c* at step ST1, the SWS or SWM bit shown in Table 1 changes from "0" to "1" at step ST2 in the input controller 21. The input pad/switch input section driver 23 which detects the transition of data bit operates on the OS 24 to start the timer at step ST3 so that the scroll operation takes place at a certain time interval.

The relevant scroll routine which is stored in the input pad/switch input section driver 23 or attached to the program is called in accordance with the setting of the timer at step ST4, and the scroll operation for the picture displayed on the display section 1 is implemented for a certain time length.

The scroll routine is called at the setup time interval so that the scroll operation of the time length takes place cyclically until the switch 5*b* or 5*c* is released by the user at step ST5. This intermittent scroll operation seems to be continuous for the user's eyes however.

When the switch 5*b* or 5*c* is released, the input pad/switch input section driver 23 detects at step ST5 the SWS or SWM bit becoming "0" in the operation data provided by the input controller 21, and it stops the timer at step ST6. In consequence, the scroll routine is terminated at step ST7 to end the scroll operation.

Accordingly, the user up-scrolls the screen continuously while pressing the far switch 5*b*, and down-scrolls the screen continuously while pressing the near switch 5*c*. The scroll operation continues until the user releases the respective switch.

Similar to the screen scroll operation shown in FIG. 3, the switch assignment can be such that the user left-scrolls the screen continuously while pressing the left-hand switch 5*a*, and right-scrolls the screen continuously while pressing the right-hand switch 5*d*.

The scroll operation shown in FIG. 3 can also be performed without using the switch input section 5 which is located in close vicinity to the input pad 4 in FIG. 1. Specifically, for example, certain keys of the keyboard 3 are assigned to the four screen scroll operations so that the screen is scrolled in response to a press of these keys in the same manner as shown in FIG. 3.

As described above, the inventive input control system is operative with its control section to set up arbitrarily functions of the four switches of the switch input section, whereby the problem of intricate operation, particularly the screen scroll operation, which has been encountered by the conventional input scheme based on the input pad and click keys can be resolved.

In addition, this invention facilitates the scroll operation based on the use of switches of the switch input section or keys of the keyboard.

What is claimed is:

1. An input control system comprising an input pad having a coordinate input portion for inputting coordinate data and four push-type switches, each of said switches is independent of said input pad and capable of having an ON state and an OFF state, wherein a finger or a pen is slid across the input pad to input information for moving a pointer appearing on a screen of a display unit in an X-axis or Y-axis direction, and is tapped on said input pad to input information in a Z-axis direction or to perform a selection operation for selecting an icon pointed to by said pointer, the display unit being provided in the input control system or in a computer connected to the input control system, wherein the four switches each comprises a default operation, said default operation being at least one operation selected from a left-click operation of a mouse, a right-click operation of a mouse, a scroll-up operation, and a scroll-down operation, respectively, when each of said four switches is switched to an ON state, wherein the default operation for each of said four switches is changeable to a different operation by setting commands generated in a switch input section driver, wherein changing of the default operation for each of said four switches is performed by a switching operation that is displayed on the screen of the display unit, said switching operation being specifically adapted to permit the setting or modification of the operation of each of said four switches, wherein input data from the input pad and data from each of said four switches is formatted to a common format data by the input controller, wherein the common format data includes X coordinate and Y coordinate positional information of the input pad, and ON or OFF information of each switch, wherein the common format data is output as a single data item to the input driver and, wherein the input driver can set or change the operation implemented in response to a pressing of each switch and processes the operation information of the input pad and the switch input section.

2. An input control system according to claim 1, wherein the common format data includes operation information indicating tapping on the input pad, and on or off operation information of each switch.

3. An input control system comprising an input pad having a coordinate input portion for inputting coordinate data and at least one push-type switch, said at least one switch is independent of said input pad and capable of having an ON state and an OFF state, wherein a finger or a pen is slid across said input pad to input information for moving a pointer appearing on a screen of a display unit in an X-axis or Y-axis direction, and is tapped on said input pad to input information in a Z-axis direction or to perform a selection operation for selecting an icon pointed to by said pointer, said display unit being provided in said input control system or in a computer connected to said input control system, wherein said at least one switch comprises a default operation, said default operation being at least one operation selected from a left-click operation of a mouse, a right-click operation of a mouse, a scroll-up operation, and a scroll-down operation, respectively, when said at least one switch is switched to an ON state, wherein said default operation for each of said at least one switch is changeable to a different operation by setting commands generated in a switch input section driver, wherein said at least one switch has a scroll function, wherein while said at least one switch is pressed so as to continuously output ON data, said at least one switch continuously performs a scrolling operation independently of an operation of the input pad, and wherein when pressing against said at least one switch is released so as to output OFF data, said at least one switch stops the scroll operation, wherein input data from the input pad and data from said at least one switch is formatted to a common format data by the input controller, wherein the common format data is output as a single data item to the input driver, and wherein the input driver can set or change the operation implemented in response to a pressing of each switch and processes the operation information of the input pad and the switch input section.

4. An input control system according to claim 3, wherein a scroll operation routine is read out for a certain time in accordance with a timer for every predetermined time period in the input pad/switch input section driver so that an image being displayed is scrolled for the certain time.

* * * * *